US012195323B2

(12) United States Patent
Seitz et al.

(10) Patent No.: US 12,195,323 B2
(45) Date of Patent: Jan. 14, 2025

(54) FUEL DELIVERY SUMP BASED FUEL FILTRATION, COALESCING, AND WATER SEPARATION SYSTEM WITH WATER STORAGE AND MULTIPLE OPERATIONAL MODES

(71) Applicant: Schroeder Industries, LLC, Leetsdale, PA (US)

(72) Inventors: Andrew Seitz, Pittsburgh, PA (US); Scott F. Surdick, Pittsburgh, PA (US); Christopher B. Bortnik, Warrendale, PA (US)

(73) Assignee: SCHROEDER INDUSTRIES, LLC, Leetsdale, PA (US)

( * ) Notice: Subject to any disclaimer, the term of this patent is extended or adjusted under 35 U.S.C. 154(b) by 902 days.

(21) Appl. No.: 17/316,597

(22) Filed: May 10, 2021

(65) Prior Publication Data

US 2021/0347633 A1 Nov. 11, 2021

Related U.S. Application Data

(60) Provisional application No. 63/022,539, filed on May 10, 2020.

(51) Int. Cl.
*B67D 7/04* (2010.01)
*B67D 7/32* (2010.01)
(Continued)

(52) U.S. Cl.
CPC ........... *B67D 7/766* (2013.01); *B67D 7/3209* (2013.01); *B67D 7/78* (2013.01)

(58) Field of Classification Search
CPC . B67D 7/68; B67D 7/04; B67D 7/766; B67D 7/36; B67D 7/32; B67D 7/78; B67D 2210/0001; B67D 7/3272; B67D 7/22; B67D 7/76; B67D 7/725; B67D 2007/329; B67D 7/62; B67D 7/3209; B01D 35/157; B01D 35/16; B01D 37/04; B01D 29/60;
(Continued)

(56) References Cited

U.S. PATENT DOCUMENTS 3,165,469 A * 1/1965 Bruns .................... B67D 7/763 210/194
2018/0257925 A1* 9/2018 Schultz ............. G01N 33/2858
(Continued)

*Primary Examiner* — Edwin J Toledo-Duran
(74) *Attorney, Agent, or Firm* — Blynn L. Shideler; Krisanne Shideler; BLK Law Group

(57) ABSTRACT

A sump space unit for dewatering fuel in an underground fuel storage tank includes fuel filtration, coalescing, and water separation with water storage. The system includes a) a housing configured to be placed within a fuel delivery sump space above an underground fuel storage tank; b) A particulate media element within the housing; c) A coalescing media element within the housing; d) A water separation media element within the housing; and e) A water/fuel storage area within the housing. In one operational mode the flow is directed through at least one of the particulate media element, the coalescing media element and the water separation media element. In one operational mode the system receives water from the underground storage tank into the housing bypassing each of the particulate media element, the coalescing media element and the water separation media element.

14 Claims, 4 Drawing Sheets

(51) Int. Cl.
*B67D 7/76* (2010.01)
*B67D 7/78* (2010.01)

(58) Field of Classification Search
CPC .. B01D 36/005; B01D 17/045; B01D 36/006; B01D 35/02; G01N 33/2858; F02M 37/28; F02M 37/32; F02M 37/44
See application file for complete search history.

(56) References Cited

U.S. PATENT DOCUMENTS

| | | | | |
|---|---|---|---|---|
| 2019/0062142 | A1* | 2/2019 | Bevins | B67D 7/3281 |
| 2020/0017351 | A1* | 1/2020 | Schultz | B67D 7/365 |
| 2020/0102205 | A1* | 4/2020 | Bevins | B67D 7/68 |
| 2020/0102206 | A1* | 4/2020 | Bevins | B67D 7/04 |
| 2020/0102207 | A1* | 4/2020 | Gibson | B67D 7/766 |

* cited by examiner

FIG. 1A
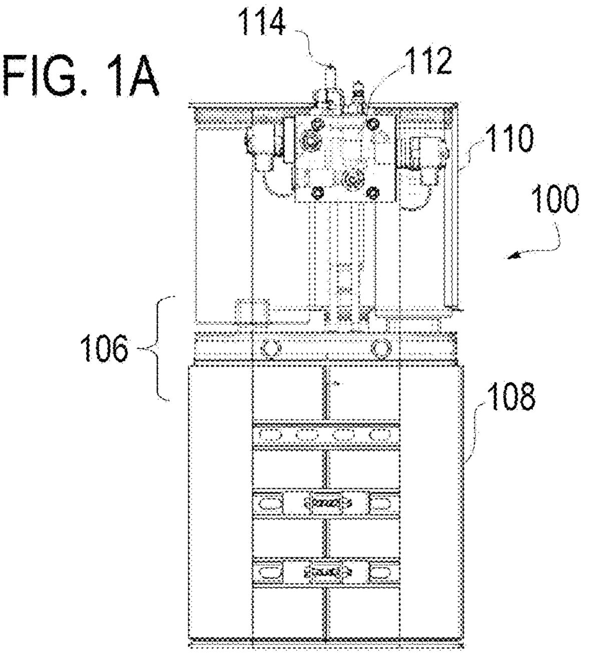
FIG. 1B
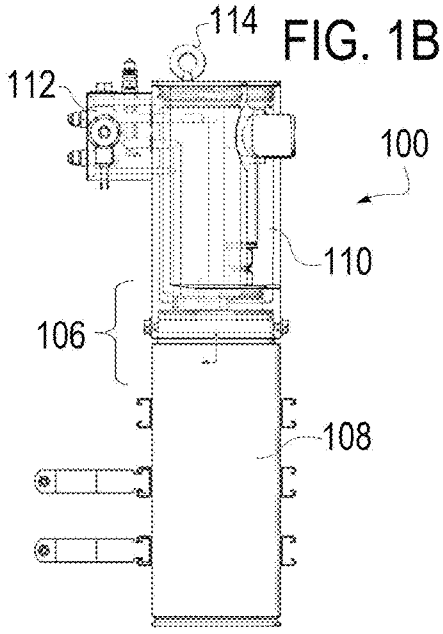
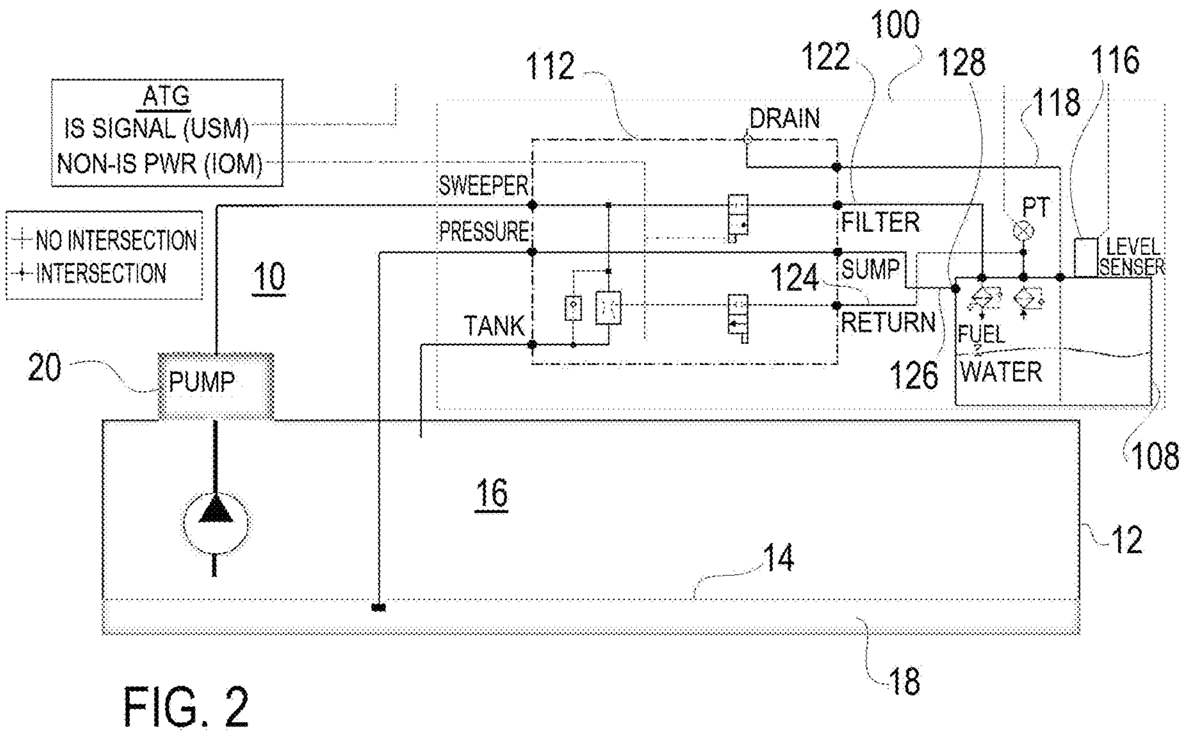
FIG. 2

FUEL DELIVERY SUMP BASED FUEL FILTRATION, COALESCING, AND WATER SEPARATION SYSTEM WITH WATER STORAGE AND MULTIPLE OPERATIONAL MODES

RELATED APPLICATIONS

The present application claims the benefit of Provisional Patent Application Ser. No. 63/022,539 filed May 10, 2020 titled "Fuel Delivery Sump Based Fuel Filtration, Coalescing, and Water Separation System with Water Storage and Multiple Operational Modes

BACKGROUND OF THE INVENTION

1. Field of the Invention

We, Andrew Seitz, Scott F. Surdick and Christopher Bortnik, employees of the applicant Schroeder Industries, LLC, have developed a fuel delivery sump based fuel treatment system and method.

2. Description of Related Art

Vehicle fuel delivery systems typically includes one or more underground storage tanks that store various fuel products, and one or more fuel dispensers that dispense the fuel products to consumers. The underground storage tanks may be coupled to the fuel dispensers via corresponding underground fuel delivery lines. In the context of an automobile fuel delivery system, for example, the fuel products may be delivered to consumers' automobiles. In such systems, the fuel products may contain a blend of gasoline and alcohol, specifically ethanol. Blends having about 2.5 vol. % ethanol ("E-2.5"), 5 vol. % ethanol ("E-5"), 10 vol. % ethanol ("E-10"), or more, in some cases up to 85 vol. % ethanol ("E-85"), are now available as fuel for cars and trucks in the United States and abroad. Other fuel products include diesel and biodiesel, for example.

Sumps (i.e., pits) generally may be provided around the equipment of the fuel delivery system. Such sumps may trap liquids and vapors to prevent environmental releases. Also, such sumps may facilitate access and repairs to the equipment. Sumps may be provided in various locations throughout the fuel delivery system. For example, dispenser sumps may be located beneath the fuel dispensers to provide access to piping, connectors, valves, and other equipment located beneath the fuel dispensers. As another example, turbine sumps may be located above the underground storage tanks to provide access to turbine pump heads, piping, leak detectors, electrical wiring, and other equipment located above the underground storage tanks. Fuel delivery sump within this application, and generally in the art, is an access space above an underground fuel storage tank typically housing a pump and other access for the underground fuel storage tank.

In some instances, small amounts of water or debris may be introduced into the storage tank, which can degrade the fuel. In a 2016 study of North Carolina gas stations more than 20 percent of the state's gas station violations related to water contaminating the fuel. For example, during periods of rain, water typically flows over pavement in the forecourt region of a service station into a storm drain. Occasionally, some of this water may make its way into an underground storage tank. Generally, water and debris are denser than the fuel stored in the tank and thus settle near the bottom of the tank. Water and fuel are immiscible, which causes a water layer to form below the fuel creating a fuel/water interface layer in the storage tank. The level of the fuel/water interface is typically monitored to ensure that water is not introduced into the inlet through which fuel is drawn from the tanks.

Many gas stations have their gas storage tanks equipped with an electronic alarm that will sound when it senses water. The station may also physically test the gas for water with a color-metric tool that turns from white to burgundy when it detects water. One solution, when water is detected within the gas above a certain level, the stations call their distributor to send a pump truck to suck the tainted fuel out of the ground and then refill the tank with good gas. It's an expensive and laborious process and it could ruin a tank of 5,000-10,000 gallons of gasoline.

On-site remediation systems have been proposed. For example, U.S. Patent Application Publication 2018-0257925 states that "Water and/or particulate matter sometimes also contaminates the fuel stored in underground storage tanks. Because these contaminants are generally heavier than the fuel product itself, any water or particulate matter found in the storage tank is generally confined to a "layer" of fuel mixed with contaminants at bottom of the tank. Because dispensation of these contaminants may have adverse effects on vehicles or other end-use applications, efforts have been made to timely detect and remediate such contaminants." Specifically it has been proposed in U.S. Patent Application Publication 2018-0257925 to provide a filter element, namely a coalescing filter element, is configured to separate water, including emulsified water and free water, from fuel product. The element is disclosed as coalescing the water into relatively heavy droplets that separate from the relatively light fuel product and settle at the lower end of element housing. Incoming fuel pressure drives fuel radially outwardly through the sidewall of filter element, while any water that is separated from the fuel is driven downwardly through the bottom of filter element and falls by gravity to the bottom of the filter housing. For similar systems see U.S. Patent Application Publication 2020-0017351.

Another system is taught in U.S. Patent Application Publication 2020-0102207 which teaches a fuel conditioning and filtration element that separates the contaminants and water from the fuel and which is located in a housing. The filter element is a coalescing filter capable of separating free and emulsified water from the fuel flowing there through while also removing other contaminants from the fuel. Similar systems are taught in U.S. Patent Application Publications 2020-0102206, 2020-0102205, and 2019-0062142.

The above identified U.S. Patent Application Publications represent the current state of the art of fuel delivery sump based fuel treatment systems and methods and these publications are incorporated herein by reference, yet there remains a need for a simple efficient and effective fuel delivery sump based fuel treatment system and method.

SUMMARY OF THE INVENTION

One embodiment of the present invention provides a sump space unit for dewatering fuel in an underground fuel storage tank that includes fuel filtration, coalescing, and water separation system with water storage and multiple operational modes. The system includes a) a system housing configured to be placed within a fuel delivery sump space above an underground fuel storage tank; b) A particulate media element within the housing; c) A coalescing media element within the housing; d) A water separation media element within the housing; and e) A water/fuel storage area within the housing. The system is configured for multiple operational modes, including a first operational mode in which the system is configured to receive wet fuel from the underground storage tank and return clean fuel to the underground storage tank wherein the flow is directed through at least one of the particulate media element, the coalescing media element and the water separation media element, and a second operational mode in which the system is configured in to receive water from the underground storage tank wherein the water is directed into the housing bypassing each of the particulate media element, the coalescing media element and the water separation media element.

These and other advantages of the present invention will be clarified in the detailed description of the preferred embodiments taken together with the associated figures.

BRIEF DESCRIPTION OF THE FIGURES

FIGS. 1A and 1B are elevational front and side views, respectively, of a fuel delivery sump based fuel filtration, coalescing, and water separation system with water storage and multiple operational modes in accordance with one embodiment of the present invention;

FIG. 2 is an operational schematic of the fuel delivery sump based fuel filtration, coalescing, and water separation system with water storage of FIGS. 1A and 1B;

DETAILED DESCRIPTION OF THE PREFERRED EMBODIMENTS

Figure 3:
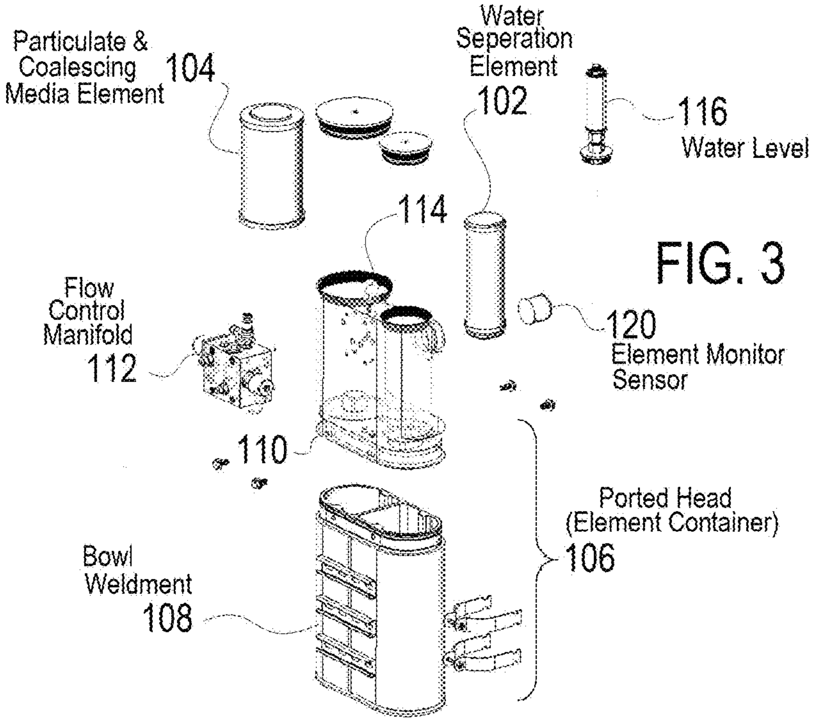
FIG. 3 is an exploded view of the fuel delivery sump based fuel filtration, coalescing, and water separation system with water storage of FIGS. 1A and 1B.

It is noted that, as used in this specification and the appended claims, the singular forms "a," "an," and "the" include plural referents unless expressly and unequivocally limited to one referent. The various embodiments and examples of the present invention as presented herein are each understood to be non-limiting with respect to the scope of the invention.

One aspect of the present invention provides a sump space 10 unit or system 100 for dewatering fuel in an underground fuel storage tank 12 that includes fuel filtration, coalescing, and water separation system with water storage and multiple operational modes. An underground fuel storage tank 12 within the meaning of this application is an underground storage tank 12 (UST) for fuel, and is ubiquitous for gas stations across the country. A detail discussion of UST 12 is found within the laws and regulations that governs underground storage tanks (USTs) and is available in the U.S. Code, Title 42, Chapter 82, Subchapter IX. This law currently incorporates amendments to Subtitle I of the Solid Waste Disposal Act as well as the UST provisions of the Energy Policy Act of 2005 and gives EPA the authority to regulate USTs.

Fuel delivery sump 10 within this application, and generally in the art, is an access space above an underground fuel storage tank 12 typically housing the pump and other access for the underground fuel storage tank 12.

There are some other terms and phrases to be defined for better understanding of the features of the present invention. An element, such as element 102 and combined element 104, within this application defines a fluid processing component with a media for treating the fluid such as particulate media for removing contaminants (in combined element 104), coalescing media or layer (in combined element 104) for coalescing fluid and separation layer (in element 102) for separating components, typically by preventing passage of a component such as a hydrophobic layer for water. A combined element, such as 104, is an element with two distinct media in a single integrated component.

Wet fuel 16 is defined herein as the fluid upstream of the system 100 of the present invention and in the underground fuel storage tank 12 generally above a petroleum-water, or boundary layer 14, within the underground storage tank 12 unless otherwise specified. Water 18 will generally be fluid below the petroleum-water interface 14 in both the underground storage tank 12 and the system 100 of the present invention, and water will also include the fluid that is being separated from the wet fuel.

Dewatered fuel or clean fuel within the meaning of this application defines fuel downstream of the system 100 of the present invention being returned to the underground fuel storage tank 12. In other words this is fluid, which will be mainly fuel, which has passed through the system 100 of the invention, allowing at least some of the water to be removed from the wet fuel by the system 100. The "dewatered fuel" may still have trace amounts of water in the fuel.

The clean fuel essentially returns to the underground storage tank 12 and can then be considered, again, as wet fuel when returned to the underground storage tank 12 as once it is back in the tank 12 it is "upstream" again of the system 100. With the return to the underground storage tank 12, the clean fuel becomes "wet fuel" as it may pick up additional water in the underground fuel storage tank 12, and this wet fuel may be processed again by the system 100 of the invention. It should be apparent that the wet fuel in the tank 12 is becoming less wet through the iterative application of the system 100 of the present invention that draws water from the fuel and the tank 12.

The system 100 includes a) a system housing 106 configured to be placed within a fuel delivery sump space 10 above an underground fuel storage tank 12; b) A particulate media element (part of combined element 104) within the housing 106; c) A coalescing media element (part of combined element 104) within the housing 106; d) A water separation media element 102 within the housing 106; and e) A water/fuel storage area 108 within the housing 106, which is formed generally by the lower part of the housing 106. The system 100 is configured for multiple operational modes, including a first operational mode in which the system 100 is configured to receive wet fuel from the underground storage tank 12 and return clean fuel to the underground storage tank 12 wherein the flow is directed through at least one of the particulate media element 104, the coalescing media element 104 and the water separation media element 102, and a second operational mode in which the system 100 is configured in to receive water from the underground storage tank 12 wherein the water is directed into the housing 106 bypassing each of the particulate media element 104, the coalescing media element 104 and the water separation media element 102.

Figure 4A:
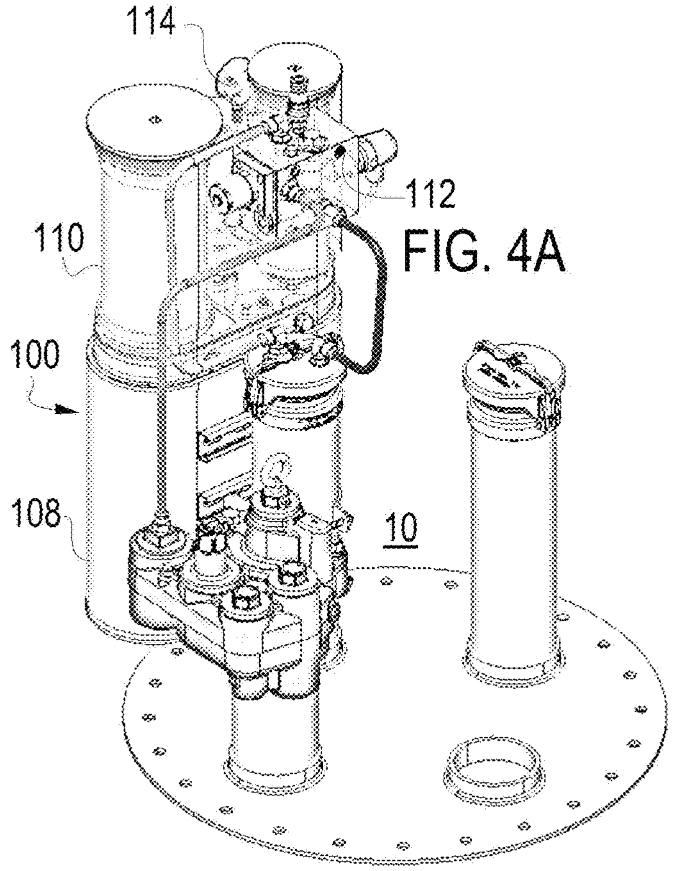
FIGS. 4A and 4B are a perspective view and a top plan view, respectively of the fuel delivery sump based fuel filtration, coalescing, and water separation system with water storage of FIGS. 1A and 1B within a sump space.
Figure 4B:
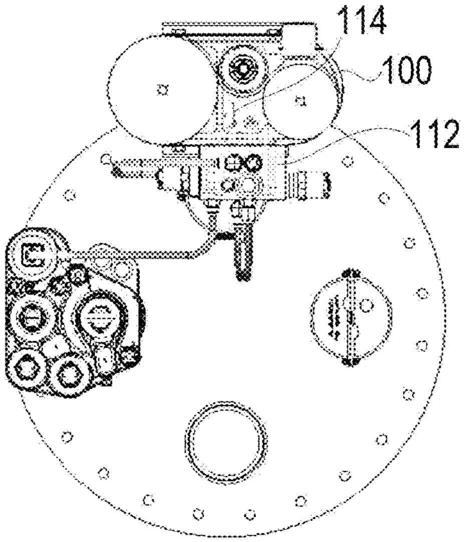

FIGS. 1A and 1B are elevational front and side views, respectively, of a fuel delivery sump based fuel filtration, coalescing, and water separation system 100 with water storage 108 and multiple operational modes in accordance with one embodiment of the present invention and FIG. 3 is an exploded view of the fuel delivery sump based fuel filtration, coalescing, and water separation system 100 with water storage 108 of FIGS. 1A and 1B. FIGS. 4A and 4B are a perspective view and a top plan view, respectively, of the fuel delivery sump based fuel filtration, coalescing, and water separation system 100 with water storage 108 of FIGS. 1A and 1B within a sump space 10. These figures show that the housing 106 is an oval structure, in plan view, formed by an upper head, also referenced as a ported head or element container 110 and a lower water storage unit 108 or bowl. As shown the height of the system 100 of the present invention is less than 32" high and a width including a valve or flow control manifold 112 of less than 12" and a width of about 15". Excluding the flow control manifold 112, the housing 106 has an oval shape in top plan view.

The housing 106 forms a water/fuel storage area 108 for the system 100. The lower water storage area 108 of the housing 106, below the element container 110, preferably will hold at least about 2 gallons of water and generally around 5 gallons of water, while the system 100 operates with about 8 gallons of fluid in the housing 106 (the area of the lower water storage area 108 and of the element container 110). The housing 106 may include a lifting eyelet 114 to facilitate placement and replacement of the system 100 within the sump space 10.

As noted above the system 100 includes a particulate media element 104 within the housing 106; a coalescing media element 104 within the housing 106; and a water separation media element 102 within the housing 106. In the embodiment shown in FIGS. 1-4 the particulate media element 104 is combined with the coalescing media element 104 forming a combined element 104 within the housing 106 and this is a drop in combined filter element 104 held within one cylindrical part of the element container 110.

Regarding the structure of a combined particulate and coalescing filter element 104 see generally the applicant's Bulk Diesel Filter Cart (BDFC) designed for those wanting to maintain clean fuel in their bulk storage tanks. The BDFC provides exceptional particulate filtration and continuous water removal even with higher flow rates. The BDFC structure illustrates the construction and operation of a particulate pre-filter and coalescing water removal filter in a combined element 104. The combined filter element 104 may be designed for inside out flow or outside in flow as designed and the element container 110 would be constructed accordingly.

The system 100 of the present invention shown in FIGS. 1-4 includes a water separation media element 102 within the housing 106 also formed as a drop in filter element held within the other cylindrical part of the element container 110. The water separation media element 102 within the housing 106 includes a hydrophobic layer to prevent water from returning to the underground storage tank 12 thorough the water separation media element. The water separation media element 102 may be designed for inside out flow or outside in flow as designed and the element container 110 would be constructed accordingly.

The system 100 of FIGS. 1-4 includes a boundary layer sensor 116 for detecting the water level within the housing 106. The sensor 116 can be optical, electronic, and/or mechanical as generally known in the art. Underground storage tanks have water level sensor technology as well. The system of FIGS. 1-4 includes will include a drain line 118 to remove water from the housing 106 as the stored water reaches a preset level. Additionally the system 100 of FIGS. 1-4 includes sensing unit 120 to evaluate the element life to assist in determining when the media elements need replacement, and these element sensors 120 may take many forms known in the art of element monitoring.

The system 100 of FIGS. 1-4 is configured for multiple operational modes. A first operational mode, called a fuel polishing mode, is provided in which the system 100 is configured to receive wet fuel from the underground storage tank 12 and return clean fuel to the underground storage tank 12 wherein the flow is directed through at least one of the particulate media element 104, the coalescing media element 104 and the water separation media element 102. In the fuel polishing operational mode of the system 100 wet fuel is delivered from underground storage tank via the tank pump 20 and line 122 to the upstream side of the particulate media element 104 and flows through the particulate media element 104 and through the coalescing element 104 into the housing 106. The coalescing element 104 acts to remove at least some of the water from the wet fuel. Within the first operational mode at least some clean fuel flows through the water separation media element 102 within the housing 106 to return to the underground fuel storage tank 12 via return line 124. The hydrophobic layer in the water separation element 102 prevents water from being returned to the tank 12 through this element 102.

Additionally the housing includes a bypass outlet 128 near a top of the housing 106 that is fluidly coupled to the underground fuel storage tank 12 via bypass/sweep line 126 and which bypasses the water separation media element 102. This bypass outlet 128 is above the inlet level for the water separation element 102. In the first operational mode, or the fuel polishing mode, the clean fluid may flow through both the water separation media element 102 and line 124 or the clean fluid outlet 128 and line 126 to be returned to the tank 12. The liquid at the upper level of the housing 106 will be clean fuel and the use of both the bypass outlet 128 and line 126 and the water separation media 102 pathways including line 124 allows the combined element 104 to set the operational flow parameters of the present invention. As the stored water in the housing 106 increases the water separation media 102 will prevent water (or fuel wetter than in the tank) from returning to the tank 12 through the system 100 and as the water/fuel interface reaches this level the water in the housing 106 will be drained via line 118.

It is possible for the polishing mode to close the bypass opening 128 and only operate with the clean fuel flowing through the water separation element 102, but this may limit the flow rate of the system 100. Alternatively, it is possible that the polishing mode operates with the clean fuel flowing only through the bypass outlet 128, such as where the water separation element 102 requires service. Thus, in the first operational mode, or the fuel polishing mode, it is preferred if the clean fluid may flow through either the water separation media element 102 or the clean fluid outlet 128 to be returned to the tank 12.

The system 100 of the present invention of FIGS. 1-4 has a second operational mode, a water pulling or priming mode, in which the system 100 is configured in to receive water from the underground storage tank 12 wherein the water is directed into the housing 106 bypassing each of the particulate media element 104, the coalescing media element 104 and the water separation media element 102. In the water pulling mode the fluid 18 is pulled from the tank 12 below the water/fuel interface 14 near the bottom of the tank 12 via line 126 and enters the housing 106 via the bypass opening 108. This allows the system 100 of the invention to be primed after element replacement or water draining or the like. This mode more rapidly pulls water 18 from the tank 12. The particulate and coalescing filter 104 is bypassed because the fluid is already essentially water and passing such through the combined filter element 104 will slow the flow parameters and significantly shorten the life of the combined element 104.

In the priming mode, particularly after element replacement, the housing 106 may have an air gap and the system 100 may vent the air gap until the top of the fluid level approaches the entrance to the separation filter 102, then the separation filter 102 would be used to return clean fluid to the tank 12. In the priming mode the particulate and coalescing element 104 is closed as an inlet, and also fluid will not flow through this element 104 as a return pathway.

The distinct operational modes of the system of FIGS. 1-4 allows for a compact but efficient system 100 to be constructed. The system 100 is configured to have an operational flow rate of at least 0.2 gallons per minute through the system in the low flow operational mode and a water capacity of at least 2 gallons. The system 100 is designed for effectively continuous operation, except for element replacement and system repair with the system 100 cycling between fuel polishing mode then water drainage and priming before returning to fuel polishing mode. The system 100 of the present invention is scalable to the sump space 10 size available, and sometimes without affecting the polishing rate flow parameters. For example another smaller system 100 may have only a 2 gallon water storage area 108 below the element container 110. The reduction of the water holding capacity does not alter the operation other than to require cycling through the water removing and priming cycles more often between the semi-continuous polishing mode.

Figure 5:
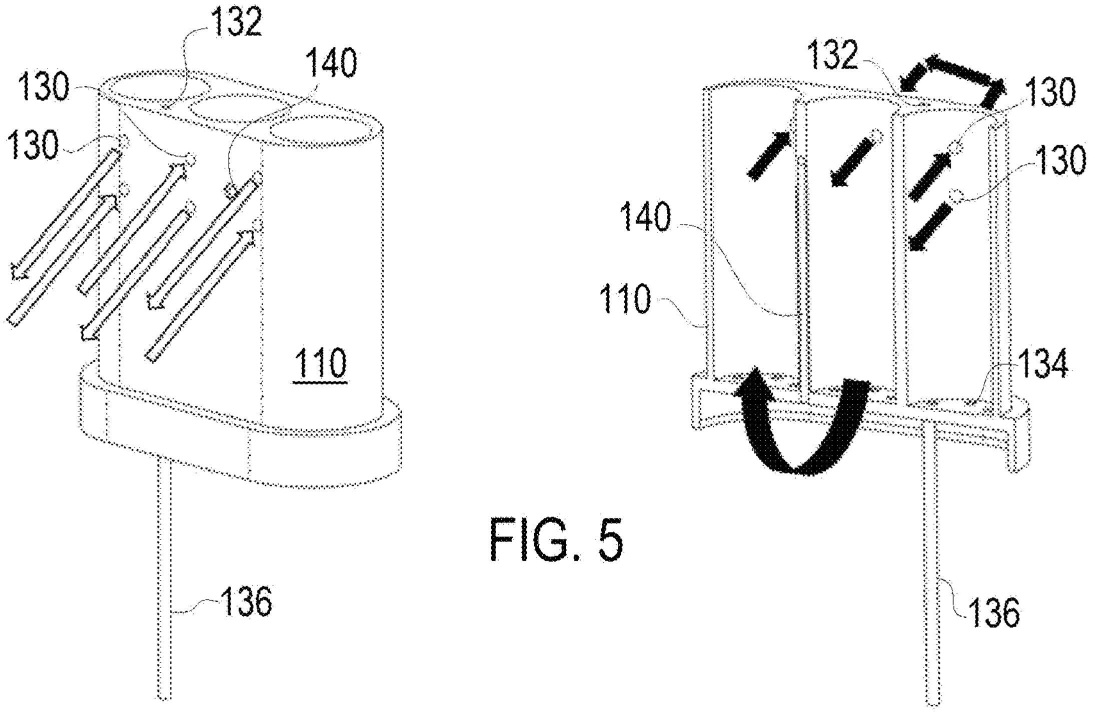
FIG. 5 is a schematic representation of a three element modular design, shown in perspective and in section, for use with a water storage housing in accordance with an alternative embodiment of the present invention.

FIG. 5 is a schematic representation of a three element modular design, with the element container 110 thereof shown in perspective and in section, for use with a water storage housing in accordance with an alternative embodiment of the present invention. Specifically it illustrates a 3 unit element container for coupling to the lower water storage area 108 of the housing 106 of FIGS. 1-4. The ports 130 in each cylindrical bowl of the element container 110 as shown could be designed as either an inlet or outlet whereby the Inlet and outlet ports can be designated in order to establish the flow direction within an element (inside-out or outside-in). An end cap with a radial seal on the outside of the end cap, could separate the two ports 130 within a single cylindrical element receiving portion. A key aspect of this configuration is the provision of an element bypass port 140: the primary function of this design is to remove water (intermittent phase) from diesel fuel (continuous phase). When those two phases switch (water becomes the continuous phase), the element bypass port 140 allows water to bypass the elements as discussed above. This allows the elements to maintain a high efficiency. The unit includes Drainage/Internal Interconnect Ports 134: these can serve either of two functions: Allow water that is separated to drain into the sump of the housing, or Serve as an internal pathway from one element cavity to another. A Water Siphon Connection 132 is provided to yield an external pump can be connected in order to remove water from the sump 108 and a Water Siphon Downtube 136 is provided wherein the downtube 136 allows for water to be drained from the bottom of the sump 108 via connection 132 and eliminate/minimize any sitting water at the bottom of the sump.

For the embodiment of FIG. 5, any combination of element configuration (particulate and/or coalescing and/or separation) can be used, specific to an applications needs (high particulate contaminant, high water content). However consistent with the system described above the embodiment of FIG. 5 may have a particulate filter element in series with a coalescing element in two bowls, likely adjacent bowls, and a water separation element in parallel in the third bowl. This arrangement would effectively operate in the same manner as described above.

An alternative arrangement for FIG. 5 is to have a single combined particulate coalescing element as with the design of FIGS. 1-4 but two separate water separation filters for increased polishing flow through the separations filters. A further alternative arrangement is to have a two combined particulate coalescing elements each coupled to a different underground storage tank and using the same water storage area 108. The remaining element can be a water separation element whose outlet flow is directed to the tank currently directing flow to the system.

Yet another configuration of FIG. 5 is to have three combined particulate coalescing and water separation elements (3 in one element) each coupled to a different underground storage tank and using the same water storage area 108. For such a three in one element the clean fuel would be directed back to the tank from the element, similar to the flow from the water separation element described above. The set up of FIG. 5 is intended to provide a modular design for system designers to create the system 100 dictated by the particular application.

Figure 6:
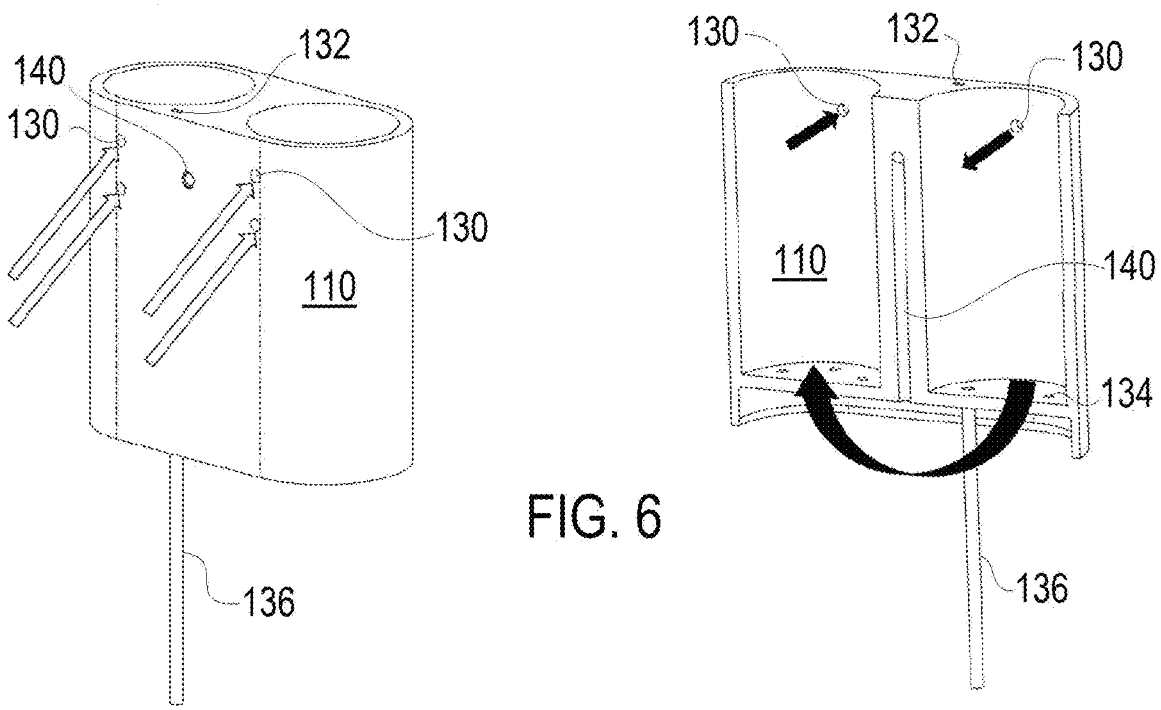
FIG. 6 is a schematic representation of a two element modular design, shown in perspective and in section, for use with a water storage housing in accordance with an alternative embodiment of the present invention.

FIG. 6 is a schematic representation of a two element modular design, with the element container 110 thereof shown shown in perspective and in section, for use with a water storage housing 106 in accordance with an alternative embodiment of the present invention. Specifically it illustrates a two unit element container 110 for coupling to the lower water storage housing 106 of FIGS. 1-4. The ports 130 in each cylindrical bowl as shown could be designed as either an inlet or outlet whereby the Inlet and outlet ports 130 can be designated in order to establish the flow direction within an element (inside-out or outside-in). This unit is a more generic implementation of the system shown in FIGS. 1-4, and if one bowl includes a combined particulate and coalescing element 104 and the other bowl includes a water separation element 102 with a hydrophobic layer it is essentially the system 100 described above in FIGS. 1-4 (with slightly different element sizing as shown), FIG. 6, like FIG. 5 is intended to yield a modular base for numerous implementations, for example FIG. 6 may have two combined particulate coalescing and water separation elements (3 in one element) each coupled to a different underground storage tank and using the same water storage. For such a three in one element the clean fuel would be directed back to the tank 12 from the element, similar to the flow from the water separation element described above. The setup of FIG. 6 is intended to provide a modular two bowl design for system designers to create the system dictated by the particular application.

Figure 7:
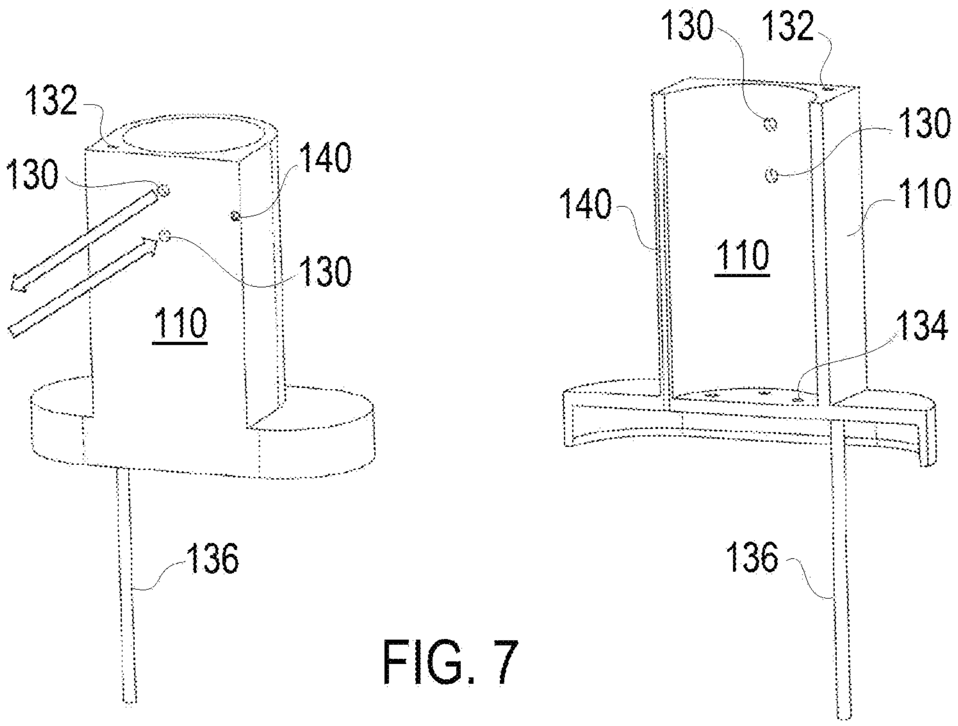
FIG. 7 is a schematic representation of a single element modular design, shown in perspective and in section, for use with a water storage housing in accordance with an alternative embodiment of the present invention.

FIG. 7 is a schematic representation of a single element modular design, with the element container 110 thereof shown shown in perspective and in section, for use with a water storage housing 106 in accordance with an alternative embodiment of the present invention. Specifically it illustrates a single unit element container for coupling to the lower water storage housing of FIGS. 1-4. Obviously the unit of FIG. 7 is utilized where only a single, likely combined element is implemented.

These and other alternatives of the present invention will be apparent to those of ordinary skill in the art and will not depart from the spirit and scope of the present invention which is defined by the appended claims and equivalents thereto.

We claim:

1. A fuel delivery sump based fuel filtration, coalescing, and water separation system with water storage and multiple operational modes, the system comprising:

A) a housing configured to be placed within a fuel delivery sump space above a underground fuel storage tank, wherein the housing includes a bypass outlet in the housing that is fluidly coupled to the underground fuel storage tank;

B) a particulate media element within the housing;

C) a coalescing media element within the housing, wherein the particulate media element is combined with the coalescing media element forming a combined drop in element within a first cylindrical element containing portion of the housing;

D) a water separation drop in media element within a second cylindrical element containing portion of the housing;

E) a water/fuel storage area within the housing;

F) wherein the system is configured for multiple operational modes, including a first operational mode in which the system is configured to receive wet fuel from the underground storage tank and return clean fuel to the underground storage tank wherein the flow is directed through at least one of the particulate media element, the coalescing media element and the water separation media element, and a second operational mode in which the system is configured to receive water from the underground storage tank via the bypass outlet wherein the water is directed into the housing bypassing the first cylindrical element containing portion of the housing and the second cylindrical element containing portion of the housing and thus each of the particulate media element, the coalescing media element and the water separation media element, wherein in said second operational mode of the system, water is delivered from below an expected petroleum-water interface in the underground storage tank to the housing through the bypass outlet for a time sufficient to fill the housing.

2. The system according to claim 1 wherein the water separation media element within the housing includes hydrophobic layer to prevent water from returning thorough the water separation media element.

3. The system according to claim 1 wherein in said first operational mode of the system wet fuel is delivered from underground storage tank to the upstream side of the combined drop in element within the first cylindrical element containing portion of the housing and flows through the combined drop in element into the water/fuel storage area within the housing, and at least some clean fuel flows through the water separation drop in media element within the second cylindrical element containing portion of the housing to return to the underground fuel storage tank.

4. The system according to claim 1 further including a drain coupled to a lower end of the water and fuel storage area within the housing for draining water therefrom.

5. The system according to claim 1 wherein the system is configured to have an operational flow rate of at least 0.2 gallons per minute through the system and a water capacity of at least 2 gallons.

6. The system according to claim 1 wherein the housing is oval in plan view.

7. A fuel delivery sump based fuel dewatering system with water storage comprising:

a system housing configured to be placed within a fuel delivery sump space above a underground fuel storage tank, wherein the system housing includes a bypass outlet in the housing that is fluidly coupled to the underground fuel storage tank, a drop in coalescing media element within a first cylindrical element containing portion of the system housing, a drop in water separation media element within a second cylindrical element containing portion of the system housing, wherein the water separation media element within the second cylindrical element containing portion of the system housing includes hydrophobic layer to prevent water from returning thorough the element, a water/fuel storage area within the system housing below the first and second cylindrical element containing portion of the system housing, with the bypass opening in fluid communication with the water/fuel storage area within the system housing; and wherein the system is configured to have an operational flow rate of at least 0.2 gallons per minute through the system and a water capacity of at least 4 gallons; and wherein the system is operated in a first operational mode in which the system receives wet fuel from the underground storage tank and return clean fuel to the underground storage tank wherein the flow is directed through at least one of the media elements; and wherein the system is operated in a second operational mode in which the system receives water from the underground storage tank via the bypass outlet wherein the water is directed into the system housing bypassing the first cylindrical element and the second cylindrical element of the system housing and thus each of the media elements, wherein in said second operational mode of the system, water is delivered from below an expected petroleum-water interface in the underground storage tank to the system housing through the bypass outlet for a time sufficient to fill the housing.

8. The system according to claim 7 further including a particulate media element within the housing.

9. The system according to claim 8 wherein the particulate media element is combined with the coalescing media element forming a combined element within the housing.

10. The system according to claim 7 further including a drain coupled to a lower end of the water and fuel storage area within the housing for draining water therefrom.

11. The system according to claim 7 wherein the housing is oval in plan view.

12. A method of operating a fuel delivery sump based fuel filtration, coalescing, and water separation system with water storage comprising the steps of:

providing a housing within a fuel delivery sump space above a underground fuel storage tank, wherein the housing includes a bypass outlet in the housing that is fluidly coupled to the underground fuel storage tank, with a particulate media element within the housing, a coalescing media element within the housing, wherein the particulate media element is combined with the coalescing media element forming a combined drop in element within a first cylindrical element containing portion of the housing, a drop in water separation media element within a second cylindrical element containing portion of the housing, and a water/fuel storage area within the housing;

selectively operating the system in a first operational mode in which the system receives wet fuel from the underground storage tank and return clean fuel to the underground storage tank wherein the flow is directed through at least one of the particulate media element, the coalescing media element and the water separation media element; and selectively operating the system in a second operational mode in which the system receives water from the underground storage tank via the bypass outlet wherein the water is directed into the housing bypassing the first cylindrical element containing portion of the housing and the second cylindrical element containing portion of the housing and thus each of the particulate media element, the coalescing media element and the water separation media element, wherein in said second operational mode of the system, water is delivered from below an expected petroleum-water interface in the underground storage tank to the housing through the bypass outlet for a time sufficient to fill the housing.

13. The method according to claim 12 wherein the system has an operational flow rate of at least 0.2 gallons per minute through the system and a water capacity of at least 2 gallons.

14. The method according to claim 12 wherein the particulate media element is combined with the coalescing media element forming a combined element within the housing.

* * * * *